Feb. 24, 1931.    G. R. MEYERCORD ET AL    1,794,194
EMBOSSED PLYWOOD
Filed Oct. 10, 1929
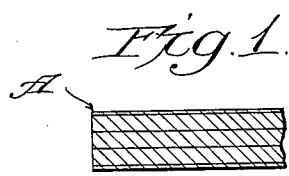
Fig.1.
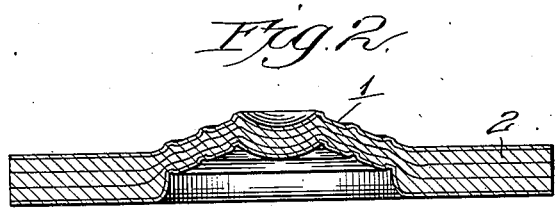
Fig.2.
Fig.3.
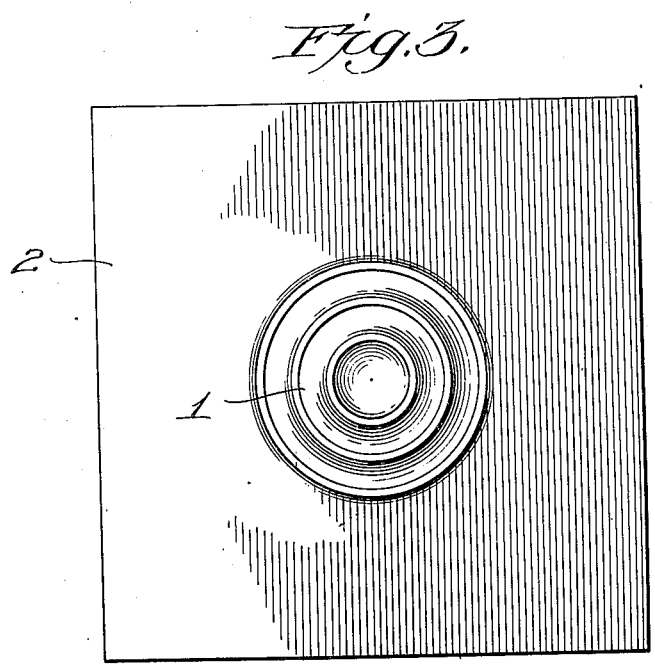
Fig.4.
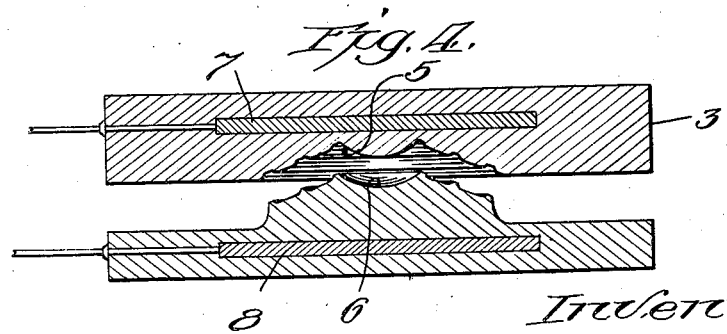
Inventors:
G. R. Meyercord
and C. B. Norris
by Wm. F. Freudenreich, Atty Patented Feb. 24, 1931

1,794,194

UNITED STATES PATENT OFFICE

GEORGE R. MEYERCORD, OF CHICAGO, ILLINOIS, AND CHARLES B. NORRIS, OF GRAND RAPIDS, MICHIGAN, ASSIGNORS TO HASKELITE MANUFACTURING CORPORATION, A CORPORATION OF NEW YORK

EMBOSSED PLYWOOD

Original application filed March 15, 1929, Serial No. 347,436. Divided and this application filed October 10, 1929. Serial No. 398,802.

It is possible to emboss plywood of the type in which the plies are secured together by means of a waterproof glue, by pressing a panel, after it has been softened by boiling, between male and female dies. Great difficulty, however, is experienced when it is sought to produce relief that will be clean and sharp and have the appearance of a wood carving. The present invention consists of an embossed plywood panel, in which the embossing is sharp and clean and the outer layer of veneer is left without visible breaks or defects resulting from the embossing process.

In order to secure a perfect product, the dies must of course be accurately made but, if a panel is compressed equally throughout its area, or if the pressure and temperature factors are not properly chosen, or if there is no provision for getting rid of the excess moisture which the panel contains due to the boiling thereof to permit it to be molded, the resulting product will not be satisfactory. The panels to be embossed usually consist of cores faced with veneers of the rarer woods. We have found that goods results are not obtained unless the panel is highly compressed in areas where the embossing is heavy; a reduction in thickness to one-half the initial thickness, or even less, being often necessary. However, if this same reduction in thickness is carried to other parts of the panel where there is no embossing, for example, the grain of the core will show through the veneer. Also, if the dies are simply closed on the work, and held closed, the surface of the panel will be blistered.

The various features of novelty whereby our invention is characterized will hereinafter be pointed out with particularity in the claims; but, for a full understanding of our invention and of its objects and advantages, reference may be had to the following detailed description taken in connection with the accompanying drawing, wherein:

Figure 1 is an edge view of a fragment of a plywood panel before the embossing operation; Fig. 2 is a section through a fragment of the same panel, after the embossing operation; Fig. 3 is a top plan view of a fragment of the embossed panel; and Fig. 4 is a vertical section through a pair of embossing dies by means of which the panel of Fig. 1 may be transformed into the panel of Fig. 2.

The present application is a division of our prior application, Serial Number 347,436, filed March 15, 1929.

Assuming that the plywood panel of Fig. 1 is to be transformed into a panel having a highly embossed area 1 surrounded by flat areas 2, 2 as indicated in Fig. 2, we have found that the material of the area 1 should be compressed until the thickness is greatly reduced, preferably more than half; whereas the flat areas 2 should be compressed only slightly, in comparison. Where the flat areas are near the edges of the panel, the compression thereof need not be greater than ten percent whereas, when they are located elsewhere, the reduction in thickness should be somewhat more, perhaps fifteen or twenty percent.

The first requirement in the manufacture of the embossed panel is that the faces of the die blocks 3 and 4, including the dies 5 and 6, be so shaped that each part of the panel will be compressed to the desired extent when the dies are closed on the panel under a predetermined pressure. Therefore, if the die faces 5 and 6 fit into each other when the dies are closed while empty, the surrounding flat faces must be cut away so that they will not touch.

Assuming that the dies have been properly made: the panel to be embossed is boiled until it has the requisite degree of pliability. Ordinarily comparatively thin panels are boiled for about eight minutes. The panel is then placed between the dies and the dies are closed under a heavy pressure. The pressure employed depends somewhat on the temperature, the lower the temperature the higher the pressure. We therefore prefer to heat the dies and have found that good results are obtained by keeping the dies at a temperature of about 300° F. The dies may be heated in any suitable way as, for example, by means of electric heating elements such as conventionally indicated at 7 and 8 in Fig. 3. The pressure should be high at the beginning of the operation but, after the embossing has been fully developed and sharply defined, the pressure may be reduced while the panel is being thoroughly dried out, thereby to insure that the panel will lie flat or have the desired curvature, when it is dry. Depending upon the nature of the panel and the embossing to be applied, the high pressure may vary from three thousand pounds to six thousand pounds per square inch, while the low pressure may in each case be about one-third as great as the high pressure.

If the dies are simply closed and left closed the surface of the panel will become blistered. We have found that if the dies are opened from time to time during the first part of the embossing operation, the steam that is generated will be caused to escape in such a manner that the surface of the panel will remain unblemished. Upon opening the dies, there is a sudden inrush of cool room air across the panel and an evolution of steam from the panel. Then, when the dies are quickly closed again, the steam and air are pushed out laterally. This brief opening of the dies should be brought about at intervals while there is moisture to be eliminated. We have found in practice that if the dies are opened seven or eight times during the first five minutes of the embossing process, the dies may then be left closed, under heavy pressure, for another period of say five minutes. By the end of this second period the embossing will have been clearly defined. Thereafter the dies may be held closed until the panel has become dry; this third period usually lasting about fifteen minutes. Then, when the panel is removed it will retain its shape indefinitely without warping.

The final product may be either flat, curved or molded into dish-shape, since the present invention relates to the impressing of embossing on the panel rather than the shape of the panel itself. In any event, in order to secure sharply defined embossing that will have the appearance of hand carving, heavily embossed areas must be highly compressed while flat or slightly rounded areas must be of a thickness more nearly approaching that of the original panel.

We claim:—

1. A molded plywood panel having heavily or deeply embossed areas displaced bodily out of the plane and surrounded by portions of the panel that are unembossed or only slightly embossed, the material of the panel being compressed in said areas to about one-half the initial thickness of the panel.

2. A molded plywood panel having heavily or deeply embossed areas and portions of the panel that are unembossed or only slightly embossed, the material of the panel being compressed in said areas to about one-half the initial thickness of the panel, and being displaced bodily out of the plane of the said portions that are unembossed or only slightly embossed and those portions that are unembossed or only slightly embossed being only slightly compressed.

In testimony whereof, we sign this specification.

GEORGE R. MEYERCORD.
CHARLES B. NORRIS.